Feb. 27, 1962 W. C. McNEELY 3,022,719
CAN PUNCHING AND COFFEE BREWING APPARATUS
Filed June 5, 1958 2 Sheets-Sheet 1

INVENTOR
Wilbur C. McNeely
BY
ATTORNEY.

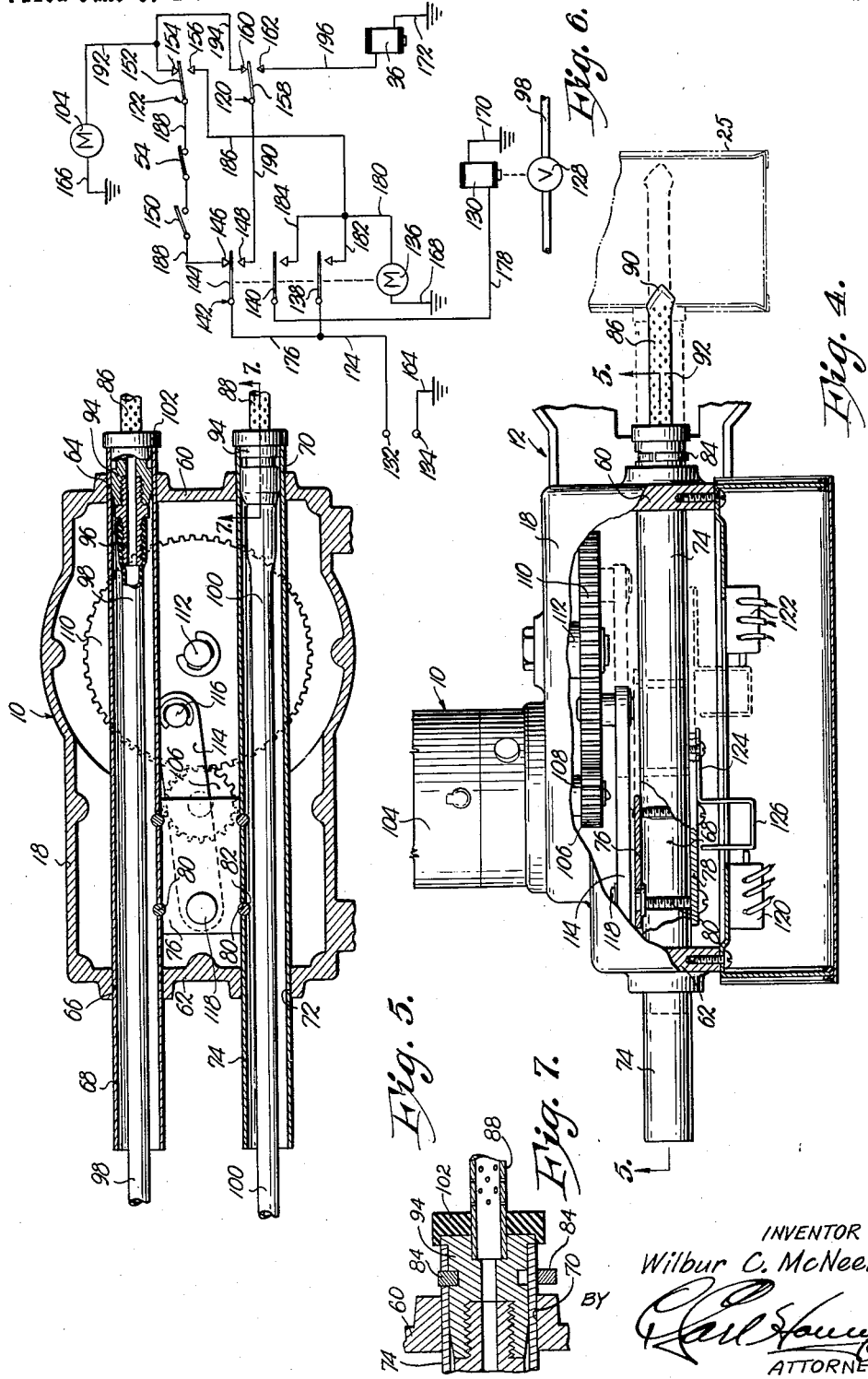

United States Patent Office 3,022,719
Patented Feb. 27, 1962

3,022,719
CAN PUNCHING AND COFFEE BREWING APPARATUS
Wilbur C. McNeely, Hickman Mills, Mo., assignor to The Vendo Company, Kansas City, Mo., a corporation of Missouri
Filed June 5, 1958, Ser. No. 740,013
13 Claims. (Cl. 99—289)

This invention relates to the field of liquid beverage preparing equipment, such as may be used in the commercial dispensing or vending of infusion brewed coffee or analogous liquid beverages, and, more particularly, to improved apparatus for the handling, punching and passage of heated water or the like under pressure into and out of disposable, initially imperforate containers in which a quantity of beverage forming material is packaged. The invention is especially, although not exclusively, adapted for use in connection with the infusion brewing of coffee from fresh coffee grounds which are vacuum packed within conventional metallic cans.

Certain known prior devices have sought to provide for the infusion brewing of beverages by apparatus which punches or pierces cans or other initially imperforate containers from opposite sides or extremities thereof and then passes the heated water or the like through the can from side-to-side or extremity-to-extremity thereof. Such prior apparatuses have involved certain marked and inherent disadvantages, including the complexity of the mechanical and hydraulic apparatus required for handling the container, punching the same from opposite directions and providing for the flow of liquid through the container, as well as the limitations imposed upon the efficiency of the infusion process when such opposed or double end punching is utilized.

It has been discovered that many of the disadvantages of double end punching apparatus may be overcome by providing for the punching of the container, the introduction of infusion liquid thereto and the conduction of brewed beverage away therefrom, all from a single direction or side of the container. It has also been discovered, however, that in order to obtain most efficient practice of the infusion brewing process with the types of containers and beverage materials involved, for instance, in connection with the infusion brewing of coffee from a vacuum packed, metallic can of fresh coffee grounds, particular arrangements of inlet and outlet connections to the pierced container are required. The latter consideration, in turn, dictates that particular arrangements of structures for piercing the container will be most advantageous.

Accordingly, it is the primary object of this invention to provide improved, single end type, container or can punching, handling and infusion brewing apparatus in which the container is held against displacement in one direction by fixed structure and is oppositely engaged by a shiftable assembly including a pair of spaced piercing elements, one of which provides an inlet coupling to the pierced container and the other of which provides an outlet coupling to the pierced container.

It is another important object of the invention to provide such improved apparatus which is of nature optimizing the simplicity and reliability of the shiftable assembly and the means for shifting the same in the manner required for first accomplishing the piercing of the container from a single direction and at spaced zones thereof, for then providing spaced, fluidtight inlet and outlet couplings to the pierced container, and for then providing for clean withdrawal of the piercing elements from the container after the infusion process has been practiced thereon.

It is another important object of the invention to provide such apparatus in which the piercing of the container and the provision of inlet and outlet couplings thereto may not only be accomplished by apparatus advancing upon the container from a single direction but also are operable with respect to a plane surface of the container, such as the end of an ordinary tin can, and without resort to the use of any bead structure or special container construction in order to attain the necessary fluid-tight seals.

Another important object of the invention is to provide such apparatus in which parts of the simplified structure utilized for rendering the piercing elements shiftable may also be conveniently employed to permit and protect the use of conduit means for coupling with the piercing elements which will be out of the way of other moving parts of the apparatus which might damage the same.

Another important object of the invention is to provide such apparatus which is of construction that can be economically manufactured at relatively low cost, involves a minimum of moving parts arranged in manner to minimize wear and necessary maintenance, and will permit quick and easy disassembling for cleaning operations required by sanitary codes or considerations, and the replacement of components when same does become necessary after prolonged use.

Still other important objects of the invention, including certain significant details of construction, will be made clear or become apparent as the following description of the invention progresses.

In the accompanying drawings:

FIG. 4 is a fragmentary top plan view of such apparatus with parts broken away for clarity of illustration and two positions of the shiftable assembly being shown with the standby position in solid lines and the operative or container penetrating position shown in dotted lines;

FIG. 5 is a cross sectional view taken on line 5—5 of FIG. 4;

FIG. 6 is a schematic representation illustrating diagrammatically certain of the electrical control parts employed in a preferred embodiment of the invention and their relationship to other portions of the overall operative structure; and FIG. 7 is an enlarged, fragmentary, vertical sectional view taken on the line 7—7 of FIG. 5 and looking in the direction of the arrows.

Figure 3:
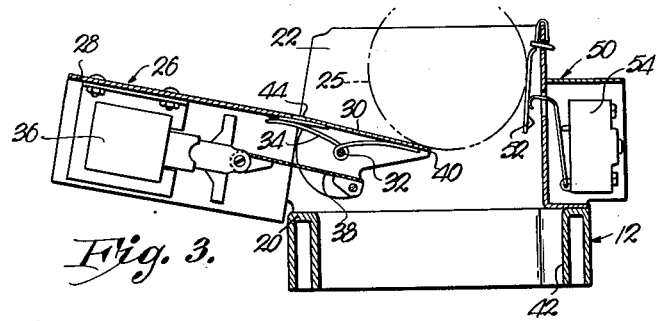
FIG. 3 is a cross sectional view taken on irregular lines 3—3 of FIGS. 1 and 2.
Figure 1:
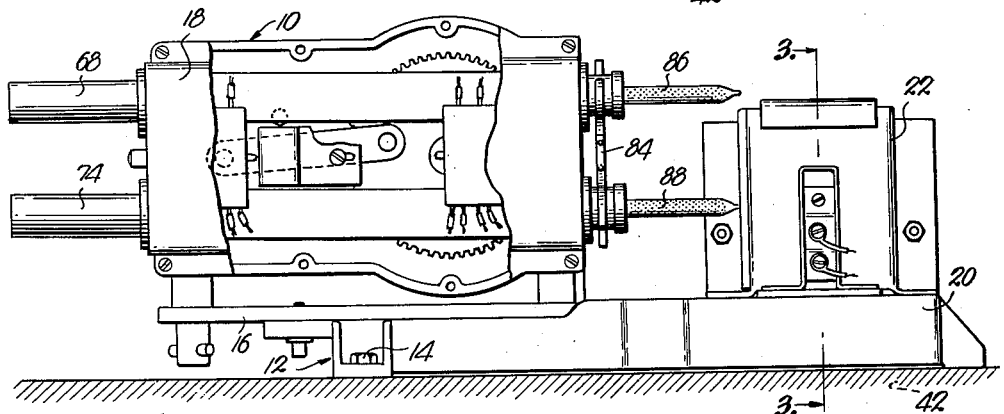
FIG. 1 is a side elevational view of a preferred embodiment of infusion brewing apparatus made in accordance with the invention, parts being broken away for clarity of illustration.

Referring now to the drawings, the embodiment of the improved apparatus contemplated by the invention chosen for illustration is generally designated by the numeral 10. Apparatus 10 includes a base assembly generally designated 12, which may be mounted within a vending machine or in other locales by any suitable means such as bolts 14. Base 12, in turn, includes a main portion 16 upon which is suitably mounted a housing 18 and a can receiving and handling portion 20 which includes a laterally, and normally uprightly, extending structure 22, which may be in the nature of a bracket secured to the base portion 20 by bolts 24. As will be clear, both the housing 18 and the laterally extending structure 22 are fixedly mounted relative to each other upon the portions 16 and 20 respectively of the base 12.

Figure 2:
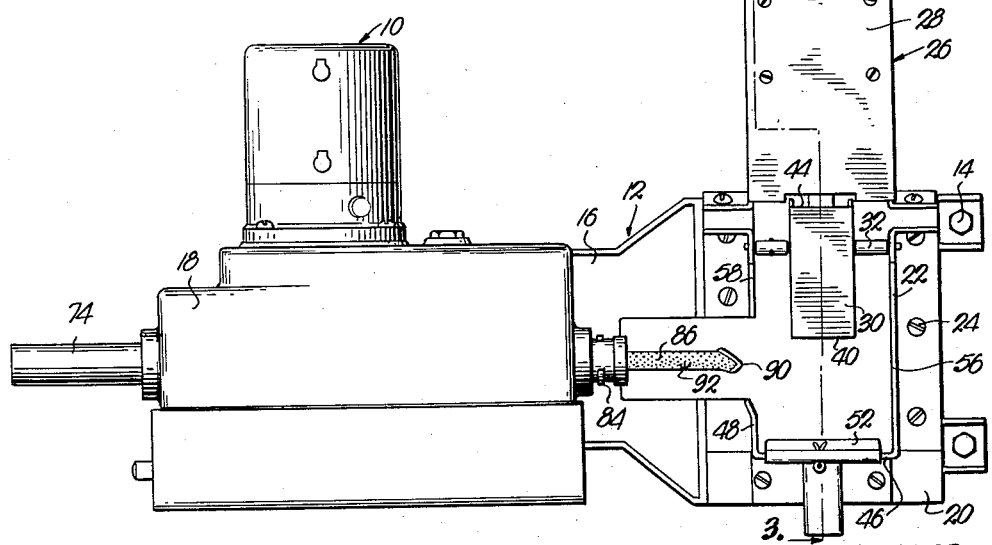
FIG. 2 is a top plan view of such apparatus.

As will be most clear from FIGS. 2 and 3, means for successively delivering initially imperforate containers 25 to an operative position adjacent the base portion 20 and the structure 22 will normally be provided, the equipment shown for illustration in this respect being generally designated by the numeral 26. Equipment 26 may include an inclined shelf 28, which may be extended as desired in either a straight or serpentine fashion to increase the container handling capacity thereof, it being understood that the shelf 28 will normally be loaded with a number of unused and imperforate containers 25 awaiting movement to the operative position shown by the container illustrated in dotted lines in FIG. 3. To control the successive advancement of containers 25 to the operative position and the discharge of same from such position, means such as a swingable supporting gate 30 pivoted upon shaft means 32 and biased by a spring 34 to the normal position illustrated in FIG. 3, may be employed in conjunction with an electrically operable solenoid 36 coupled with the gate 30 by linkage means 38. As will be clear in FIG. 3, a portion of the gate 30 adjacent the end 40 thereof is adapted to support a container 25 in operative position ready for the piercing and brewing operation when the gate 30 is in its normal, illustrated position; however, upon energization of the solenoid 36, the linkage means 38 will swing the gate 30 about the pivot shaft 32 to discharge a previously utilized container 25 through an opening 42 provided in the base portion 20 and any structure therebelow, such discharge of the container 25 being effected through the action of gravity. At the same time, the opposite end 44 of the gate 30 will temporarily serve as a stop to hold the next container 25 advancing by gravity along the shelf 28 from movement into the operative position until the solenoid 36 has been deenergized and the gate 30 returned to its normal container supporting position, as illustrated in FIG. 3.

Before passing on from a consideration of the container receiving and handling portion 20 of the base 12 and the other structures directly associated therewith, it may be noted that the bracket structure 22 may be substantially J-shaped in character, as seen in FIG. 2, to provide a side stretch 46 and a leg stretch 48. Side stretch 46 will normally be facing the direction from which the container 25 advances to operative position off of the shelf 28 and serves as a convenient mounting for container presence sensing means broadly designated 50 and including a resilient, swingable follower arm 52 adapted to be displaced by a container 25 moving into operative position in such manner that the arm 52 will operate an electrical switch indicated at 54. The leg stretch 48 is spaced from the main container backing plate part 56 of structure 22, and there is provided second bracket means 58 spaced from the plate 56 of structure 22 and aligned with the leg stretch 48 in spaced relation to the latter. It will be understood that the containers 25, when in their operative position ready for piercing and performance of the brewing process, are supported by a portion of the gate 30 adjacent the end 40 of the latter between the backing plate portion 56 of the structure 22 and the bracket means 58 and leg stretch 48, the open space between the bracket means 58 and the leg stretch 48 of the structure 22 providing access to a container 25 in operative position from a direction opposite to the stationary backing plate 56 of structure 22.

As best seen in FIGS. 4 and 5, the housing 18 upon the main body portion 16 is provided with a front wall 60 spaced from and generally parallel to the backing plate 56 and a rear wall 62 spaced from the wall 60 in a direction opposite to the backing plate 56 and generally parallel to the latter. Walls 60 and 62 are provided with aligned upper bearing surface openings 64 and 66 respectively for slidably receiving an upper, elongated, tubular member 68 and are similarly provided with aligned lower bearing surface openings 70 and 72 respectively for slidably receiving a lower, elongated, tubular member 74. Members 68 and 74 are suitably interconnected in any satisfactory fashion, as by a plate 76 and a plate 78 secured to each of same by keying bolts 80 received within indentations 82 in the members 68 and 74, to present a shiftable assembly including the members 68 and 74 and the plates 76 and 78 which may be reciprocated as a unit toward and away from the backing plate portion 56 of structure 22.

Releasably mounted upon the ends of members 68 and 74 respectively nearest the backing plate 56 of structure 22 by means of a quick disconnect type clamp 84 are a pair of piercing elements 86 and 88. The upper piercing element 86 serves to effect, in manner hereinafter described, an inlet connection with a pierced container 25 for the introduction of heated water or the like to the latter, while the lower piercing element 88 serves to provide an outlet coupling to the pierced container 25 by which infused beverage may be conducted away from the latter.

Each of the piercing elements 86 and 88 comprises an elongated, tubular, generally cylindrical piece of hard metal provided with a pointed and sharpened end 90 facing in the direction of the backing plate portion 56 of structure 22 and a plurality of perforations 92 extending around its entire periphery in spaced relation to each other between the pointed end 90 and the opposite end thereof which is received within a fitting 94 in turn secured within the corresponding of members 68 or 74. The fittings 94 are themselves tubular in character and are provided with an extension 96 having a roughened outer surface for gripping and effecting a fluid-tight coupling with the end of a flexible conduit tube 98 or 100 fitted thereupon. Flexible conduits 98 and 100 may be formed of plastic, rubber or other suitable material, and extend from and connect with the corresponding fitting extension 96 rearwardly through the corresponding of members 68 and 74 from which they emerge for coupling to a source of hot water or the like under pressure, in the case of conduit 98, and to means for receiving or dispensing brewed beverage material, in the case of conduit 100. Also shiftable with the members 68 and 74 as a part of the movable assembly including the latter is an annular, resilient gasket 102 for each of the piercing elements 86 and 88 respectively, the gaskets 102 being disposed in circumscribing relationship to the corresponding of piercing elements 86 and 88 and adapted to be squeezed between the proximate end of the corresponding of members 68 and 74 and the end wall or other structural part of the container 25 when the members 68 and 74 are fully reciprocated toward the backing plate 56 of structure 22. In such condition of reciprocation of the members 68 and 74, the piercing elements 86 and 88 are fully extended in penetrating relationship into a container 25 in the operative position and the gaskets 102 are squeezed to effect a fluid-tight seal at the points of entry of the elements 86 and 88 into the container 25.

It will be appreciated that both a high degree of reliability and a considerable amount of force are required to properly reciprocate the members 68 and 74 and the piercing elements 86 and 88 respectively carried thereby in order to accomplish the desired piercing of the container 25 and the effectuation of the required fluid-tight seals thereto. For this purpose, the preferred embodiment of the present invention employs an electric motor 104 having a small drive pinion 106 secured to its shaft 108. Drive pinion 106 meshes with a relatively larger gear 110 rotatably mounted on the housing 18 by means of a stub shaft assembly 112. A drive rod 114 is pivotally connected to the gear 110 eccentrically of the latter by a pin 116 and is oppositely pivotally connected with the plate 76 by means of a pin 118. It will thus be clear that, as the motor 104 is operated, the drive pinion 106 will rotate the gear 110 to move the pivot pin 116 coupled with drive rod 114 in a circular path. The drive rod 114, being pivotally coupled by pin 118 with the plate 76, translates the rotary motion of the pin 116 into linear travel of the pin 118, and therefore, the plate 76 and the members 68 and 74. Operation of the motor 104 for a period sufficient to rotate the gear 110 from a position such as that illustrated in FIG. 5 to a position moving the pin 118 to that zone of its path of travel closest to the wall 60 will reciprocate the members 68 and 74, and thereby the piercing elements 86 and 88 into their operative, container penetrating position. Continued operation of the motor 104 in the same direction will then move the pivot pin 116 back toward a position remote from the wall 60 and thereby reciprocably shift the members 68 and 74 and the elements 86 and 88 away from a container 25 in the operative position adjacent base portion 20, thereby withdrawing the elements 86 and 88 from the container 25 which is prevented from following by virtue of the stop provided by bracket 58 and leg stretch 48.

A pair of electrical control switches 120 and 122 hereinafter to be more fully identified in connection with the discussion of FIG. 6, may be mounted within the housing 18 in any suitable fashion, the switch 120 being disposed toward the end of housing 18 defined by wall 62 while the switch 122 will be disposed relatively closer to the extremity of housing 18 defined by wall 60. A switch operating arm 124 having a U-shaped portion 126 of proper dimensions may be secured to the plate 78 forming a part of the shiftable assembly, the U-shaped portion 126 being disposed to operate the switches 120 and 122 respectively as the members 68 and 74 are shifted between the opposite ends of their paths of travel.

Referring now to the schematic diagram of FIG. 6, it will be noted that a control valve 128 will normally be interposed in the conduit 98 to control the flow of hot water or the like to the inlet piercing element 86, such valve 128 being adapted for operation by an electrical solenoid 130. The drive motor 104, the container discharging and advance control solenoid 36 and the container sensing switch 54 are all illustrated in FIG. 6 and designated by the same numerals. In addition, the control means to be employed as a part of a preferred embodiment of the apparatus 10 will include a pair of terminals 132 and 134 adapted for coupling with a source of electrical power, an electrical timer motor 136 having operably associated therewith for operation thereby a pair of normally open, single pole, single throw switches 138 and 140 and a single pole, double throw switch generally designated 142 having a pole piece 144 normally in engagement with a stationary contact 146 being adapted for shifting away from the latter and into engagement with a stationary contact 148, a normally open cycle starting switch 150 and the out-switch 120 and the in-switch 122, which are also illustrated in FIG. 4. In-switch 122 includes a movable pole piece 152 normally in engagement with a stationary contact 154 and shiftable into engagement with a stationary contact 156, while the out-switch 120 includes a shiftable pole piece 158 normally in engagement with a stationary contact 160 and shiftable into engagement with a stationary contact 162. It will be understood that, although shown in its normal position in FIG. 6, pole piece 158 will actually be shifted into engagement with contact 162 by the action of portion 126 when the members 68 and 74 are in their standby position as illustrated in solid lines in FIG. 4. One of the power terminals 134 is grounded as at 164. The motor 104, which it is observed need not be of the reversible type, has one side thereof grounded as at 166. Similarly, the motor 136 has one side grounded thereof as at 168, the valve operating solenoid 130 has one side thereof grounded as at 170, and the gate operating solenoid 36 has one side thereof grounded as at 172. The other power terminal 132 is coupled with one side of timer switch 138 and with the pole piece 144 of timer switch 142 by conductive means 174 and 176. One side of the timer switch 140 is coupled with the ungrounded side of valve operating solenoid 130 by conductive means 178. The opposite sides of timer switches 138 and 140 and the normally open contact 156 of in-switch 122 are coupled with the ungrounded side of timer motor 136 by conductive means 180, 182, 184 and 186. Start switch 150 and the container switch 54 are coupled in series between the contact 146 of timer switch 142 and the pole piece 152 of in-switch 122 by conductive means 188. The contact 148 of timer switch 142 is coupled by conductive means 190 with the pole piece 158 of out-switch 120. The ungrounded side of the drive motor 104 is coupled with contact 154 of in-switch 122 and with contact 160 of out-switch 120 by conductive means 192 and 194. The contact 162 of out-switch 120 is coupled with the ungrounded side of the container handling solenoid 36 by conductive means 196.

In operation, assuming that electrical power is supplied to the power terminals 132 and 134, the members 68 and 74 are in their standby positions as illustrated in FIG. 5, and a container 25 is in operative position relative to the container receiving portion 20 of base 12, the entire apparatus will be in standby position with the solenoid 130 deenergized, the valve 128 closed, the solenoid 36 deenergized, the drive motor 104 deenergized and the timer motor 136 deenergized. Since the container in operative position is maintaining the switch 54 closed, upon closure of the start switch 150 (which may be controlled in any suitable fashion such as manually or by level sensing means in a storage reservoir for the brewed beverage produced by the apparatus 10), power will be supplied to the drive motor 104 from terminal 132 through conductive means 174 and 176, pole piece 144 and contact 146 of timer switch 142, conductive means 188, closed start switch 150, closed container sensing switch 54, pole piece 152 of in-switch 122, and conductive means 192 to the motor 104. As soon as the drive motor 104 has shifted the switch operating portion 126 of the bracket 124 to a point for operating the in-switch 122, the pole piece 152 thereof shifts out of engagement with the contact 154 and into engagement with the contact 156. This breaks the energizing circuit for the drive motor 104. During such operation of the drive motor 104, however, the members 68 and 74 have been shifted toward the structure 22 to carry the piercing elements 86 and 88 first into piercing then penetrating and sealed relationship with the container 25. Shifting of the pole piece 152 of in-switch 122 energizes the timer motor 136 through a circuit traceable as before to the pole piece 152, thence through conductive means 186 and 180 to the timer motor 136.

Operation of the timer motor 136 first closes the timer switch 138 which establishes a holding, energizing circuit for the timer motor 136 from the terminal 132 through conductive means 174, timer switch 138 and conductive means 182 and 180 to the motor 136. The timer motor 136 next closes the timer switch 140 to energize the solenoid 130 and open the infusion liquid input valve 128 for a predetermined period of time. At the end of such time, timer motor 136, which continues to operate, opens the timer switch 140 to deenergize the solenoid 130 and reclose the valve 128. Next, timer motor 136 shifts the pole piece 144 out of engagement with the contact 146 and into engagement with the contact 148. This completes a new energizing circuit for the drive motor 104 traceable from the power terminal 132 through the conductive means 174 and 176, the pole piece 144 and contact 148 of timer switch 142, conductive means 190, pole piece 158 and contact 160 of out-switch 120, and conductive means 194 and 192 to the drive motor 104, it being noted that pole piece 158 returned to its normal engagement with contact 160 when portion 126 initially moved toward the in position. Drive motor 104 then operates to return the members 68 and 74 to their standby positions, during which the piercing elements 86 and 88 are withdrawn from the container 25. As the members 68 and 74 return to their standby condition, the switch operating portion 126 of bracket 124 will shift the pole piece 158 of out-switch 120 away from contact 160 into engagement with contact 162. This breaks the last traced energizing circuit for the motor 104, it being noted that the start switch 150 has been opened either manually or automatically by replenishment of the supply of brewing beverage in a reservoir whose level may control the operation of the start switch 150 so that, as the pole piece 152 of in-switch 122 is restored to its normal position during withdrawal of the members 68 and 74, no reenergizing circuit for the motor 104 will be completed upon return of the pole piece 144 of the container switch 142 to its normal position until the start switch 150 has again been reclosed. Shifting of the pole piece 158 of out-switch 120 into engagement with contact 162 completes an energizing circuit for the gate operating solenoid 126 traceable as before to the pole piece 158, thence through contact 162 and conductive means 196 to the solenoid 36, this shifts the gate 30 to discharge the container 25 upon which the infusion process has just been practiced.

Next, the motor 136 restores the timer switch 142 to its normal position with the pole piece 144 in engagement with the contact 146. This, of course, breaks the previously traced energizing circuit for the gate operating solenoid 36 so that the gate 30 will be restored to its normal position by the spring 34 and the next container 25 will move by gravity into operative position ready for piercing and infusion. As such container reaches the operative position, switch 54, which will have opened after discharge of the preceding container 25, will be reclosed. Finally, the timer motor 136 reopens timer switch 138 to break its own energizing circuit, at which time the apparatus is restored both mechanically and electrically to its original, standby condition in readiness for a further operating cycle upon a subsequent closing of the start switch 150.

It will now be apparent that the apparatus contemplated by this invention is ideally adapted to accomplish all of the objects and advantages referred to above. It will also be evident that, although a number of constructional relationships and details are important, certain minor modifications and changes could be made without departing from the true spirit or the intention of the invention. Accordingly, it is to be understood that the invention should be deemed limited only by the scope of the claims that follow.

Having thus described the invention what is claimed as new and desired to be secured by Letters Patent is:

1. In apparatus for the infusion brewing of coffee and analogous liquid beverages by the passage of water under pressure into and out of a disposable, initially imperforate container through a quantity of beverage forming material packaged within the container, a pair of opposed relatively shiftable assemblies movable relatively toward and away from each other between a standby relationship in which the assemblies are disposed for receiving therebetween a container of the kind hereinbefore mentioned and an operative relationship in which the assemblies oppositely engage said container; power means operably coupled with one of the assemblies for shifting the latter relatively between said standby and operative relationships; a pair of elongated, parallel, tubular, laterally perforate, container-piercing elements each having an open end and a closed, pointed, end, both of said piercing elements being mounted on the same one of said assemblies and being adapted for piercing the container and entering the latter from only that direction proximate said one assembly as the assemblies are relatively shifted from said standby to said operative relationship thereof, one only of said pair of elements including passage means therein coupling said open end thereof with the lateral perforations thereof for providing only an inlet coupling to said container within the latter when the assemblies are in said operative relationship thereof, the other only of said pair of elements including passage means therein coupling said open end thereof with the lateral perforations thereof for providing only an outlet coupling to said container within the latter when the assemblies are in said operative relationship thereof; means for providing fluid-tight seals between the container and each of said elements when the assemblies are in said operative relationship thereof; means coupled with said open end of said one element for introducing water under pressure to said passage means of said one element when the assemblies are in said operative relationship thereof; means coupled with said open end of said other element for receiving infused beverage from said passage means of said other element when the assemblies are in said operative relationship thereof; structure for supporting a plurality of said containers; and means for advancing said containers successively to a position between the assemblies.

2. In apparatus as set forth in claim 1, wherein the other of said assemblies is stationary, and said one assembly is shiftable.

3. In apparatus as set forth in claim 2, wherein said one assembly is mounted for linear reciprocation toward and away from said other assembly, and said shifting means is operably coupled with said one assembly for reciprocating the latter.

4. In apparatus as set forth in claim 1, wherein said assembly shifting means, said water introducing means and said container advancing means are each operable electrically, and there is provided electrical control mechanism operably coupled with each of said last three mentioned means for successively operating said advancing means to move a container between the assemblies while the latter are in said standby relationship, said shifting means to shift the assemblies into said operative relationship, said introducing means to introduce water into the container between the assemblies for passage through said material, said introducing means to terminate said introduction of water, and said shifting means to shift the assemblies into said standby relationship and release the container from the assemblies.

5. In apparatus as set forth in claim 1, wherein said shifting means includes a prime mover fixedly mounted relative to the other of said pair of assemblies, and rotary-to-reciprocatory motion translating means operably coupling the prime mover with said one assembly.

6. In apparatus as set forth in claim 1, wherein said elements are disposed with their longitudinal axes in vertically spaced relation to each other.

7. In apparatus as set forth in claim 1, wherein said one assembly is provided with a resilient sealing member in circumscribing relationship to a zone of each of said elements respectively adjacent said one assembly for providing a liquid-tight seal between the elements and a container pierced by the latter when the assemblies are in said operative relationship thereof.

8. In apparatus for the infusion brewing of coffee and analogous liquid beverages by the passage of water under pressure into and out of a disposable, initially imperforate container through a quantity of beverage forming material packaged within the container, a base assembly, including a main portion and a container receiving portion provided with container engaging structure; a shiftable assembly, including a pair of elongated, parallel members; means mounting the shiftable assembly on the base assembly for reciprocable movement of the shiftable assembly longitudinally of said members toward and away from said structure; crank means rotatably mounted on the base assembly; a prime mover operably coupled with said crank means for rotating the latter; linkage means operably coupling the crank means with the shiftable assembly for reciprocating the latter as the crank is rotated; a perforated, container-piercing element for each of said members respectively, said elements being mounted on the corresponding members for reciprocation with said one assembly and adapted to pierce a container in operative position from only the side thereof opposite said structure when said one assembly is shifted toward said structure; means for providing fluid-tight seals between the container and each of said elements when said one assembly is fully shifted toward said structure; first conduit means coupled with only one of said elements and adapted for coupling with a source of water under pressure; second conduit means coupled with only the other of said elements for receiving brewed beverage therefrom; and means carried by said base assembly for supplying another container to said container receiving portion of the base assembly upon return of the shiftable assembly to the initial disposition thereof away from said structure.

9. In apparatus as set forth in claim 8, wherein said members are tubular, and said conduit means each includes a stretch within the corresponding member.

10. In apparatus as set forth in claim 8, wherein is provided valve means in said first conduit means.

11. In apparatus as set forth in claim 10, wherein said prime mover is electrically operable, said valve means is electrically operable, and there is provided electrical control means operably coupled with the prime mover and the valve means for sequentially operating the prime mover to shift the elements toward said structure and into penetrating relationship to a container, opening the valve means, reclosing the valve means, and operating the prime mover to shift the elements away from said structure and out of penetrating relationship to said container.

12. In apparatus as set forth in claim 11, wherein said control means includes timer switch means operably coupled with the valve means for reclosing the latter a predetermined time after opening thereof.

13. In apparatus as set forth in claim 12, wherein is provided electrically responsive means for discharging a container from said container receiving portion of the base assembly, and said control means is operably coupled with said discharging means for actuating the latter after each reclosing of said valve means.

References Cited in the file of this patent

UNITED STATES PATENTS

| | | |
|---|---|---|
| 2,209,313 | Ackley | July 30, 1940 |
| 2,306,550 | Mailey | Dec. 29, 1942 |
| 2,419,845 | Merrick | Apr. 29, 1947 |
| 2,492,309 | Miller | Dec. 27, 1949 |
| 2,618,407 | Thorn | Nov. 18, 1952 |
| 2,710,115 | Chandler | June 7, 1955 |
| 2,734,658 | Poitras | Feb. 14, 1956 |
| 2,776,076 | Nunn | Jan. 1, 1957 |
| 2,817,372 | Barr | Dec. 24, 1957 |
| 2,883,922 | Andres | Apr. 28, 1959 |

FOREIGN PATENTS

| | | |
|---|---|---|
| 535,172 | Great Britain | Apr. 1, 1941 |